(12) United States Patent
Singh

(10) Patent No.: US 7,755,474 B2
(45) Date of Patent: Jul. 13, 2010

(54) AUTOMOTIVE BRAKE LIGHTING

(76) Inventor: Sanjeev Kumar Singh, 54 Lawrence Ave., Danbury, CT (US) 06810

( * ) Notice: Subject to any disclaimer, the term of this patent is extended or adjusted under 35 U.S.C. 154(b) by 308 days.

(21) Appl. No.: 11/757,113

(22) Filed: Jun. 1, 2007

(65) Prior Publication Data

US 2008/0297338 A1    Dec. 4, 2008

(51) Int. Cl.
*B60Q 1/44* (2006.01)
(52) U.S. Cl. .................. 340/479; 340/464; 340/467
(58) Field of Classification Search ................. 340/464, 340/467, 469, 479
See application file for complete search history.

(56) References Cited

U.S. PATENT DOCUMENTS

| | | | | |
|---|---|---|---|---|
| 4,785,281 | A | * | 11/1988 | Cameron ..................... 340/479 |
| 5,001,398 | A | * | 3/1991 | Dunn ........................... 315/77 |
| 5,150,098 | A | * | 9/1992 | Rakow ......................... 340/479 |
| 5,231,373 | A | * | 7/1993 | Freeman et al. ............. 340/469 |
| 5,610,578 | A | * | 3/1997 | Gilmore ...................... 340/479 |
| 6,150,933 | A | | 11/2000 | Matsumoto |
| 6,160,476 | A | | 12/2000 | Ponziani |
| 6,525,656 | B1 | * | 2/2003 | Hahn .......................... 340/463 |
| 6,573,830 | B2 | | 6/2003 | Cohen et al. |
| 6,693,525 | B1 | | 2/2004 | McIlvain |
| 6,960,008 | B2 | | 11/2005 | Voelker |
| 7,307,518 | B2 | * | 12/2007 | Bogos ......................... 340/479 |
| 7,357,539 | B2 | | 4/2008 | Voelker |
| 7,400,238 | B2 | | 7/2008 | Clark et al. |
| 7,525,418 | B2 | * | 4/2009 | Tsai ............................ 340/479 |
| 7,573,378 | B2 | | 8/2009 | Matsumoto et al. |
| 2001/0054957 | A1 | | 12/2001 | Cohen et al. |
| 2002/0158757 | A1 | * | 10/2002 | Stubock ...................... 340/479 |
| 2004/0246737 | A1 | | 12/2004 | Voelker |
| 2005/0040702 | A1 | | 2/2005 | Yen et al. |
| 2005/0190051 | A1 | | 9/2005 | Dinda |
| 2006/0181146 | A1 | | 8/2006 | Voelker |
| 2006/0232396 | A1 | * | 10/2006 | Oasem ........................ 340/479 |
| 2007/0279207 | A1 | | 12/2007 | Clark et al. |
| 2008/0079555 | A1 | | 4/2008 | Wang |
| 2008/0094200 | A1 | | 4/2008 | Matsumoto et al. |

\* cited by examiner

*Primary Examiner*—Brent Swarthout
(74) *Attorney, Agent, or Firm*—Sanjeev K. Singh

(57) ABSTRACT

A method and an apparatus are provided for controllably illuminating automotive brake lights. In one embodiment, an automotive brake lighting system comprises a brake light including first and second light sources, a sensor to sense a level of an operating condition associated with at least one of a brake assembly or a brake pedal of a motor vehicle for illuminating the brake light, and a controller configured to monitor information provided by the sensor. The controller, in response to the level of the operating condition, selectively powers the at least one of the first or second light sources of the brake light based at least in part on the monitored information to generate a variable visual indication relating to braking of the motor vehicle from the brake light over a range of at least two different visual indications that indicate a variable braking rate of the motor vehicle over a corresponding range of at least two different braking rates.

15 Claims, 3 Drawing Sheets

AUTOMOTIVE BRAKE LIGHTING

BACKGROUND OF THE INVENTION

1. Field of the Invention

This invention relates generally to automotive systems, and more particularly, to automotive brake lighting systems.

2. Description of the Related Art

A lighting system of a motor vehicle consists of lighting and signaling devices mounted or integrated to the front, sides and rear of the vehicle. The purpose of this system is to provide illumination by which for the driver to operate the vehicle safely after dark, to increase the conspicuity of the vehicle, and to display information about the vehicle's presence, position, size, direction of travel, and driver's intentions regarding direction and speed of travel.

A lighting system of a motor vehicle also comprises rear position lamps (tail lamps) sometimes referred to as a brake light or a stop light. A brake light or a stop light is a red light on the rear of a motor vehicle that signals when the brakes are applied to slow or stop. Besides the conventional taillights sometimes A Center High-Mounted Stop Lamp (usually seen abbreviated as CHMSL) is used as a third stop lamp, or brake light. It is mounted on the rear of a vehicle. It is usually placed above the rear window, or is affixed inside the window and projects through it. In some creative arrangements, the CHMSL is integrated into a spoiler. A CHMSL is usually thought of as a car safety feature.

Nighttime vehicle conspicuity to the rear is provided by rear position lamps disposed in a brake light, stop light, tail light, tail lamp and rear light. These are required to produce only red light, and to be wired such that they are lit whenever the front position lamps are illuminated—including when the headlamps are on. Rear position lamps may be combined with the vehicles brake lamps, or separate from them. In combined-function installations, the lamps produce brighter red light for the brake lamp function, and dimmer red light for the rear position lamp function. Regulations worldwide stipulate minimum intensity ratios between the bright (brake) and dim (tail) modes, so that a vehicle displaying rear position lamps will not be mistakenly interpreted as showing brake lamps, and vice versa. Rear position lamps are permitted, required or forbidden to illuminate in combination with daytime running lamps, depending on the jurisdiction and the DRL implementation

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one embodiment of the present invention, a method is provided for illuminating a brake light including first and second light sources. The method comprises monitoring information provided by a sensor that senses a level of an operating condition associated with at least one of a brake assembly or a brake pedal of a motor vehicle. The method further comprises, in response to the level of the operating condition, selectively powering the at least one of the first or second light sources of the brake light based at least in part on the monitored information to generate a variable visual indication relating to braking of the motor vehicle from the brake light over a range of at least two different visual indications that indicate a variable braking rate of the motor vehicle over a corresponding range of at least two different braking rates.

In another embodiment, an automotive brake lighting system comprises a brake light including first and second light sources, a sensor to sense a level of an operating condition associated with at least one of a brake assembly or a brake pedal of a motor vehicle for illuminating the brake light, and a controller configured to monitor information provided by the sensor. The controller, in response to the level of the operating condition, selectively powers the at least one of the first or second light sources of the brake light based at least in part on the monitored information to generate a variable visual indication relating to braking of the motor vehicle from the brake light over a range of at least two different visual indications that indicate a variable braking rate of the motor vehicle over a corresponding range of at least two different braking rates.

BRIEF DESCRIPTION OF THE DRAWINGS

The invention may be understood by reference to the following description taken in conjunction with the accompanying drawings, in which like reference numerals identify like elements, and in which.

Figure 1:
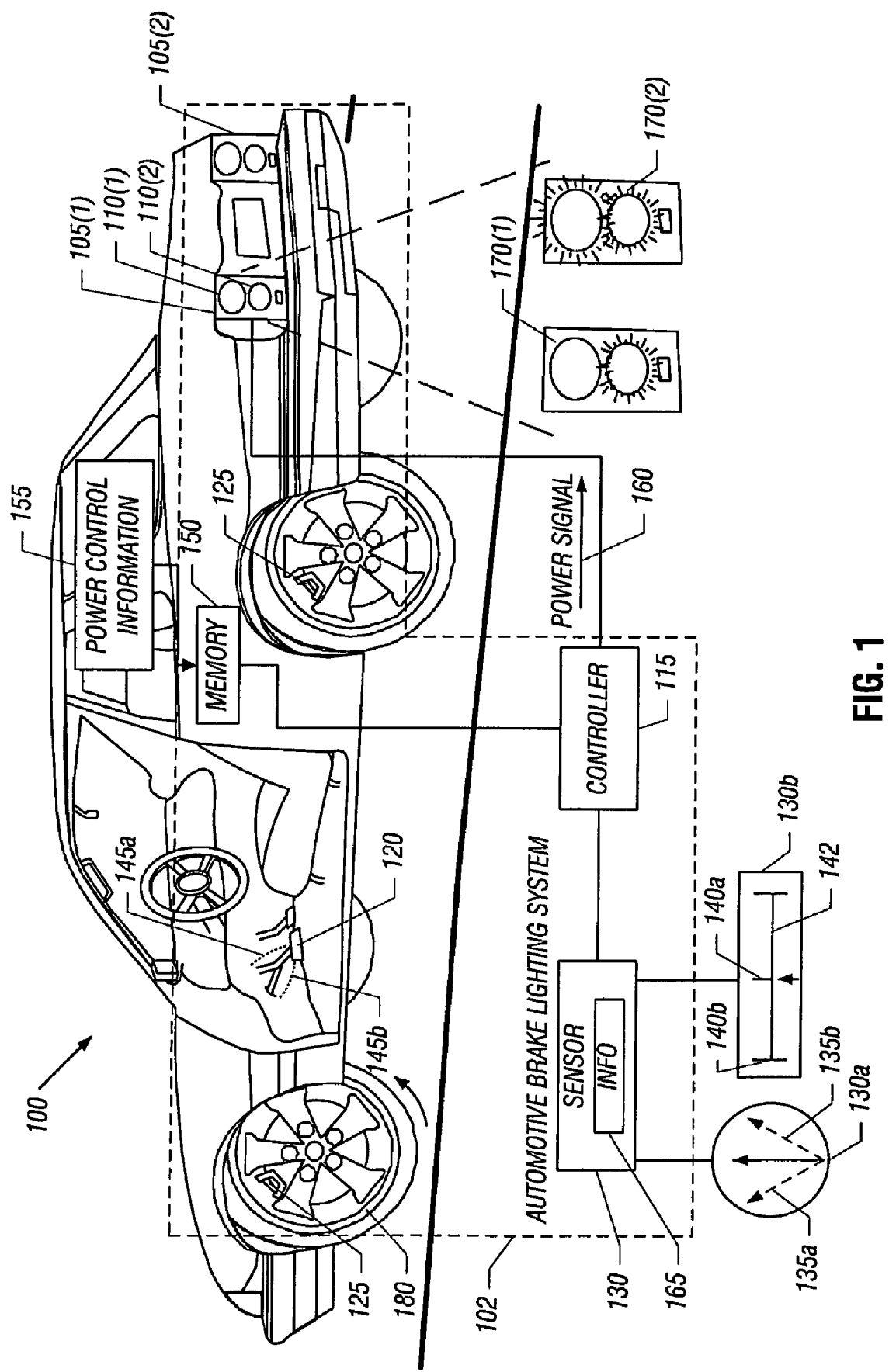
FIG. 1 schematically illustrates a motor vehicle to include an automotive brake lighting system comprising a first brake light and a second brake light in accordance with one exemplary embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Generally, a method and apparatus are provided for controllably illuminating automotive brake lights. In one embodiment, an automotive brake lighting system comprises a brake light including first and second light sources, a sensor to sense a level of an operating condition associated with at least one of a brake assembly or a brake pedal of a motor vehicle for illuminating the brake light, and a controller configured to monitor information provided by the sensor. The controller, in response to the level of the operating condition, selectively powers the at least one of the first or second light sources of the brake light based at least in part on the monitored information to generate a variable visual indication relating to braking of the motor vehicle from the brake light over a range of at least two different visual indications that indicate a variable braking rate of the motor vehicle over a corresponding range of at least two different braking rates.

Referring to FIG. 1, a motor vehicle 100 is illustrated to include an automotive brake lighting system 102 comprising a first brake light 105(1) and a second brake light 105(2) in accordance with one exemplary embodiment of the present invention. In one embodiment, the first brake light 105(1) may comprise a first light source 110(1) and a second light source 110(2). For controllably illuminating the first and second light sources 105(1, 2) of the first brake light 105(1), the automotive brake lighting system 102 may comprise a controller 115. Examples of the motor vehicle 100 include a car, sports utility vehicle, bus, truck, tractor, motorcycle, hybrid vehicle and a multipurpose automotive having one or a pair of tail lights that may generally be used for indicating braking of the motor vehicle 100. Examples of the controller 115 include a processor or microcontroller capable to monitoring information provided by the automotive brake lighting system 102.

To provide an ability to apply brake by a driver, the automotive brake lighting system 102 of the motor vehicle 100 may comprise a conventional brake pedal 120 and an associated conventional brake assembly 125. The automotive brake lighting system 102 may further comprise a sensor 130 that senses a level of an operating condition associated with at least one of the brake assembly 125 or the brake pedal 120 of the motor vehicle 100. The sensor 130 may comprise a pressure sensor 130a and a position sensor 130b to sense a pressure level or a position level, respectively. While the controller 115 may monitor information provided by the sensor 130, the sensor 130 may sense a pedal pressure level and/or a pedal position level.

For example, the pressure sensor 130a may sense the pressure level on the brake assembly 125 and/or the brake pedal 120. That is, the pressure sensor 130a may detect a first pressure level 135a a foot of a driver on the brake pedal 120. The position sensor 130b may sense a pedal level (145a or 145b) of the brake pedal 120 and/or a brake pad position of the brake assembly 125. In one illustrative embodiment, the position sensor 130b may detect a first position 140a of the brake assembly 125 and/or the brake pedal 120 of the motor vehicle 100 relative to an initial position 140b thereof, as shown by a position scale 142 of the position sensor 130b.

Consistent with one illustrative embodiment of the present invention, the automotive brake lighting system 102 any further comprise memory 150 coupled to the controller 115. The memory 150 may be capable of storing power control information 155 associated with a power signal 160. The controller 115 may be capable of retrieving the power control information 155 for selectively powering the first and/or second light sources 110(1,2) of the first brake light 105(1).

In operation, to selectively power the first and/or second light sources 110(1, 2) of the first brake light 105(1), the controller 115 may be configured to monitor information (INFO) 165 provided by the sensor 130. Based at least in part on the monitored INFO 165, in response to a level of the operating condition, the controller 115 may selectively power either one of the first light source 110(1) or the second light source 110(2) or both of them at the same time.

By selectively lighting or switching ON one or both of the first and second light sources 110(1,2) of the first brake light 105(1), the controller 115 may generate a variable visual indication relating to braking of the motor vehicle 100 from the first brake light 105(1) over a range of at least two different visual indications 170(1,2). These two different visual indications 170(1,2) may indicate a variable braking rate of the motor vehicle 100 over a corresponding range of at least two different braking rates 175(1,2). For example, in accordance with one embodiment of the present invention, a braking rate may refer to a change in revolutions per second of a tire 180 of the motor vehicle 100. That is, the braking rate may be defined based on a number of revolutions per second by which the tire 180 of the motor vehicle 100 may be rotating or braking. In other words, the braking rate may correlate to slowing down of the tire 180 as indicated by a desired speed level in miles per hour shown by a speedometer or a desired distance measured in feet that the motor vehicle 100 may traverse as shown by a trip meter on a road or a similar pavement surface and the like before coming to a partial or complete halt.

According to one exemplary embodiment of the present invention, the controller 115 may be configured to calibrate positions of the brake assembly 125 and/or the brake pedal to braking rates that generate a variable visual indication relating to braking of the motor vehicle 100. For example, based on a first pressure level 135a, the controller 115 may form a first visual warning pattern for a first visual indication 170(1) by powering one of the first and second light sources 110(1,2) of the first brake light 105(1). Likewise, based on a second pressure level 135b, the controller 115 may form a second visual warning pattern different than the first visual warning pattern for a second visual indication 170(2) by substantially simultaneously powering both the first and second light sources 110(1,2) of the first brake light 105(1).

The controller 115 may be configured to calibrate the initial position 140b of the brake assembly 125 and/or the brake pedal 120 to a first braking rate and calibrate the first position 140a of the brake assembly 125 and/or the brake pedal 120 to a second braking rate. In one embodiment, the second braking rate may be higher than the first braking rate. In one embodiment, this braking rate may be determined based on a distance in feet that the motor vehicle 100 may traverse before coming to a full or complete halt on a road or a similar pavement surface and the like.

Figure 2:
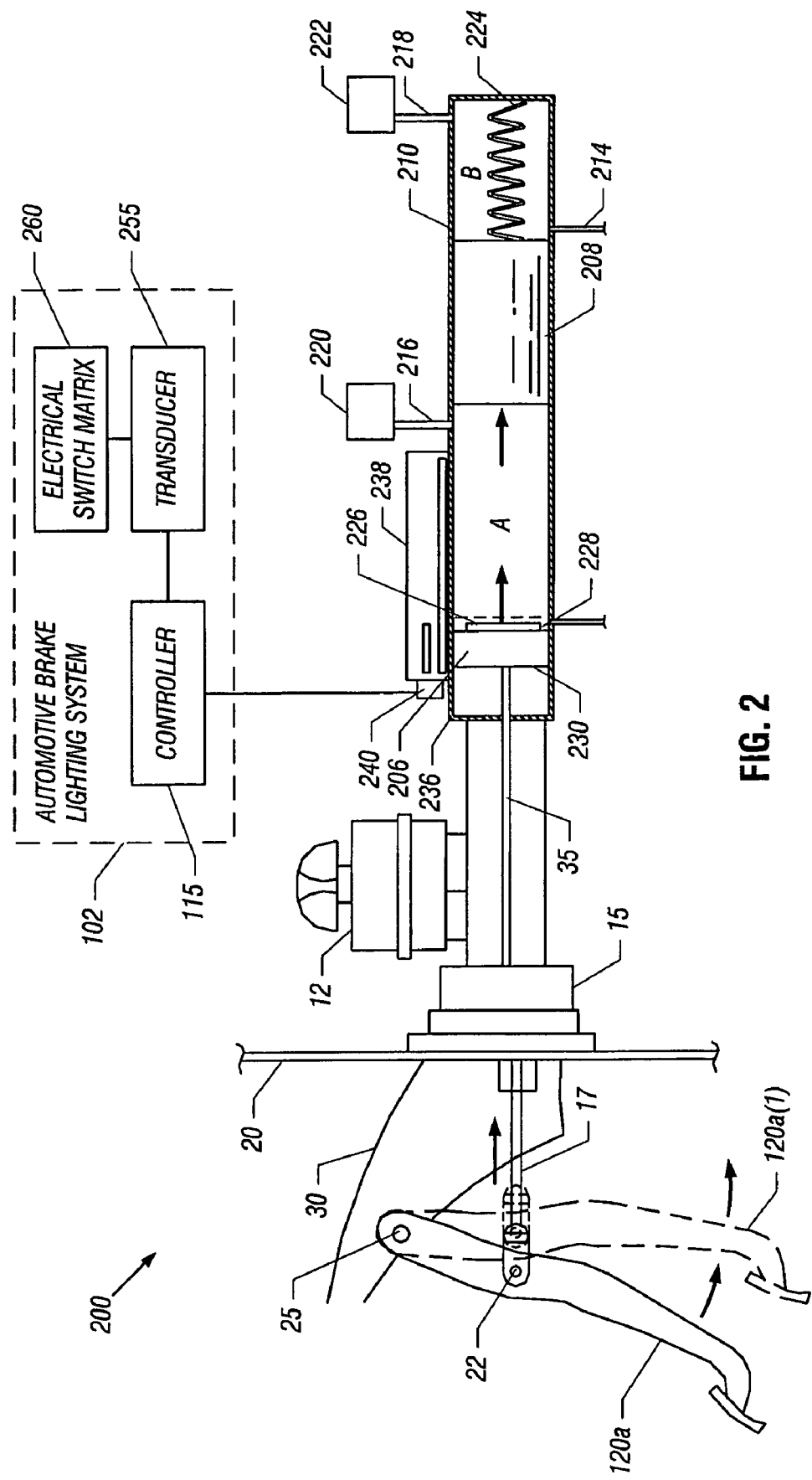
FIG. 2 schematically illustrates a vehicle hydraulic brake system according to one embodiment of the present invention to electronically control the automotive brake lighting system shown in FIG. 1 consistent with one embodiment of the present invention.

Next, as indicated in FIG. 2, a vehicle hydraulic brake system 200 may be formed in a variety of ways, e.g., using a tandem master cylinder or a two-circuit main brake cylinder in accordance with the disclosures set forth in the following U.S. Patent Application Publication No. 2003/0205931: Ser. No. 10/447,640, filed May 29, 2003, entitled "Apparatus for determining positions and movements of a brake pedal for a vehicle brake system" and Ser. No. 244,245 and PCT No. PCT/DE93/00802, PCT filed Sep. 4, 1993 (Section 102(e) and 371 date Aug. 19, 1994), entitled "Hydraulic Brake Device having An Anti-Skid System" all of which are hereby incorporated by reference.

In general, as will be discussed more fully below, the vehicle hydraulic brake system 200 may comprise an apparatus for determining a pedal displacement of a brake pedal 120a. In one embodiment, a magnetic element disposed on a piston in the interior of a housing of a brake cylinder may be used, which cooperates with a sensor element disposed at the outside of the brake cylinder to detect positions and movements of the piston. As positions and movements of the piston connected to the magnetic element correspond directly with positions and movements of a brake pedal 120a connected rigidly and directly thereto or characterize the positions and movements in the case of an indirect connection to the brake pedal 120a, it is possible on the basis of positions and movements, which are determined for the piston, to infer the underlying pedal displacement of the brake pedal 120a. Of course, many different detector type suitable combinations are possible.

Referring to FIG. 2, the vehicle hydraulic brake system 200 is schematically illustrated according to one embodiment of the present invention to electronically control the automotive brake lighting system 102 shown in FIG. 1. The vehicle hydraulic brake system 200 comprises a master brake cylinder 10 with a reservoir 12 supplying fluid thereto. A pneumatic braking force amplifier 15 sometimes also called a booster may be coupled to the master brake cylinder 10. A pushrod 17 penetrating a dash panel 20 from the pneumatic braking force amplifier 15 may be coupled to a brake pedal 120a via a hinge 22. The brake pedal 120a may be pivotally supported by a brake pedal hinge 25 coupled to a dash bracket 30 fixed to the dash panel 20.

The vehicle hydraulic brake system 200 may actuate the master brake cylinder 10 using an actuating member 35, which may be coupled to a first piston 206 disposed in the master brake cylinder 10. To provide a desired actuation, the actuating member 35 may be coupled to the brake pedal 120a via the pneumatic braking force amplifier 15.

In operation, the first piston 206 together with a second piston 208 disposed in the master brake cylinder 10 within a housing 210 of the master brake cylinder 10 delimits first and second hydraulic chambers A and B. The hydraulic chambers A and B may contain hydraulic fluid, which may flow in or flow off via associated supply connections 212 and 214. The hydraulic chambers A and B may be connected by fluid lines 216 and 218 to wheel brakes 220 and 222 for supplying the latter with hydraulic fluid based on an actuation of the master brake cylinder 10. A spring 224 may cooperate with the second piston 208 in order to position the latter in the master brake cylinder 10 based on an actuation of the actuating member 35. The spring 224 may further move the second piston 208 and, via the fluid connection in the first hydraulic chamber A, the first piston 206 into their neutral positions when the master brake cylinder 10 is not actuated.

As the first piston 206 is connected directly and rigidly to the actuating member 35, a displacement of the first piston 206 corresponds directly to a corresponding movement of the actuating member 35 and therefore characterizes the actuation of the brake pedal 120a, more precisely the pedal displacement to a position indicated by the brake pedal 120a(1), effected by a vehicle driver. In other words, a movement of the first piston 206 corresponds directly to the underlying pedal displacement when the brake pedal 120a is directly connected to the actuating member 35. When a brake booster, illustrated in FIG. 2 as the pneumatic force amplifier 15, being disposed between the actuating member 35 and the brake pedal 120a is used, its parameters may be taken into account to determine from a displacement of the first piston 206 the corresponding pedal displacement.

Consistent with one embodiment, for the purposes of determining the pedal displacement from a resulting displacement of the first piston 206 upon an actuation of the brake pedal 120a, the vehicle hydraulic brake system 200 may comprise a primary detector 226, which is fitted in a fixed manner on the first piston 206. Although the primary detector 226 is illustrated in FIG. 2 as disposed on an end face 228 of the first piston 206 facing the first hydraulic chamber A. the primary detector 226 may otherwise be fastened to an opposite end face 230. Other suitable arrangements of individual or multiple components, which fulfill the function of the primary detector 226, on the first piston 206 are shown in FIG. 2 of the US Patent Publication Number 2003/0205931, which is incorporated herein by reference.

Disposed at an outer surface 236 of the housing 210 of the master brake cylinder 10 is a sensor device 238, which cooperates with the primary detector 226 to determine positions and movements of the first piston 206. Based on the positions and movements of the primary detector 226 and hence of the first piston 206, the sensor device 238 may provide corresponding signals, which relay via a signal interface 240 to the controller 115, which may use these signals to control the operation of the motor vehicle 100 and, in particular, to control the automotive brake lighting system 102, as set forth above in FIG. 1. For example, a transducer 255 may electrically activate a switch matrix 260 associated with the controller 115 for selectively providing the power signal to 160 to the first and/or second light sources 110(1,2) of the first brake light 105(1).

Consistent with one embodiment of the present invention, the transducer 255 may comprise a reed switch operable by the primary detector 226. A reed switch is an electric switch that consists of a pair of ferrous metal contacts in a hermetically sealed glass envelope. A permanent magnet placed in close proximity to the switch causes the contacts to pull together, thus completing an electrical circuit. Reed switches, for example, may be used as means which detect the start of a movement of the sensor device 238 from its rest position. The signals generated by the means which detect the start of a movement of the sensor device 238 may drive the switch matrix 260 to selectively activate the first and/or second light sources 110(1,2) of the first brake light 105(1). That is, upon movement detection of the brake pedal 120a by using the reed switch, the transducer 255 sends a signal to a control box, i.e., the switch matrix 260 which then selectively activates the first and/or second light sources 110(1,2) of the first brake light 105(1).

Consistent with one embodiment of the present invention, the transducer 255 may detect a first position of the brake assembly and/or the brake pedal of the motor vehicle relative to an initial position of the brake assembly and/or the brake pedal. The switch matrix 260 may be coupled to the transducer 255 to illuminate one of the first and second light sources 110(1,2) of the first brake light 105(1). For the transducer 255, the controller 115 may be configured to calibrate the initial position of the brake assembly and/or the brake pedal to a first braking rate that generates a variable visual indication relating to braking of the motor vehicle based on a first pressure level of a foot of a driver on the brake pedal 120a so as to form a first visual warning pattern by powering the first and second light sources 110(1,2) of the first brake light 105(1). Additionally, for the transducer 255, the controller 115 may be configured to calibrate the first position of the brake assembly and/or the brake pedal to a second braking rate that generates a variable visual indication relating to braking of the motor vehicle based on a second pressure level of the foot of the driver on the brake pedal 120a so as to form a second visual warning pattern different than the first visual warning pattern by powering the first and second light sources 110(1,2) of the first brake light 105(1), wherein the second braking rate is higher than the first braking rate. In this way, the controller 115 may access the memory 150 storing power control information associated with the power signal 160 based on the calibrated movement detected of the brake pedal 120a by using the transducer 255 for selectively powering the at least one of the first or second light sources 110(1,2) of the brake light 105(1).

Consistent with one embodiment of the present invention, the controller 115 may be configured to selectively provide the power signal 160 to the first and/or second light sources 110(1,2) of the first brake light 105(1) to generate visible radiation from the braking or stop light by switching the at least one of the first or second light sources 110(1,2) of the first brake light 105(1) on. For example, the controller 115 may be configured to provide a pulse-width-modulation control for illuminating the brake light 105(1) for the motor vehicle 100 to provide the visible radiation having a perceivable color with a variable intensity over a range of at least two different perceivable intensities that indicate the variable braking rate of the motor vehicle 100.

Figure 3:
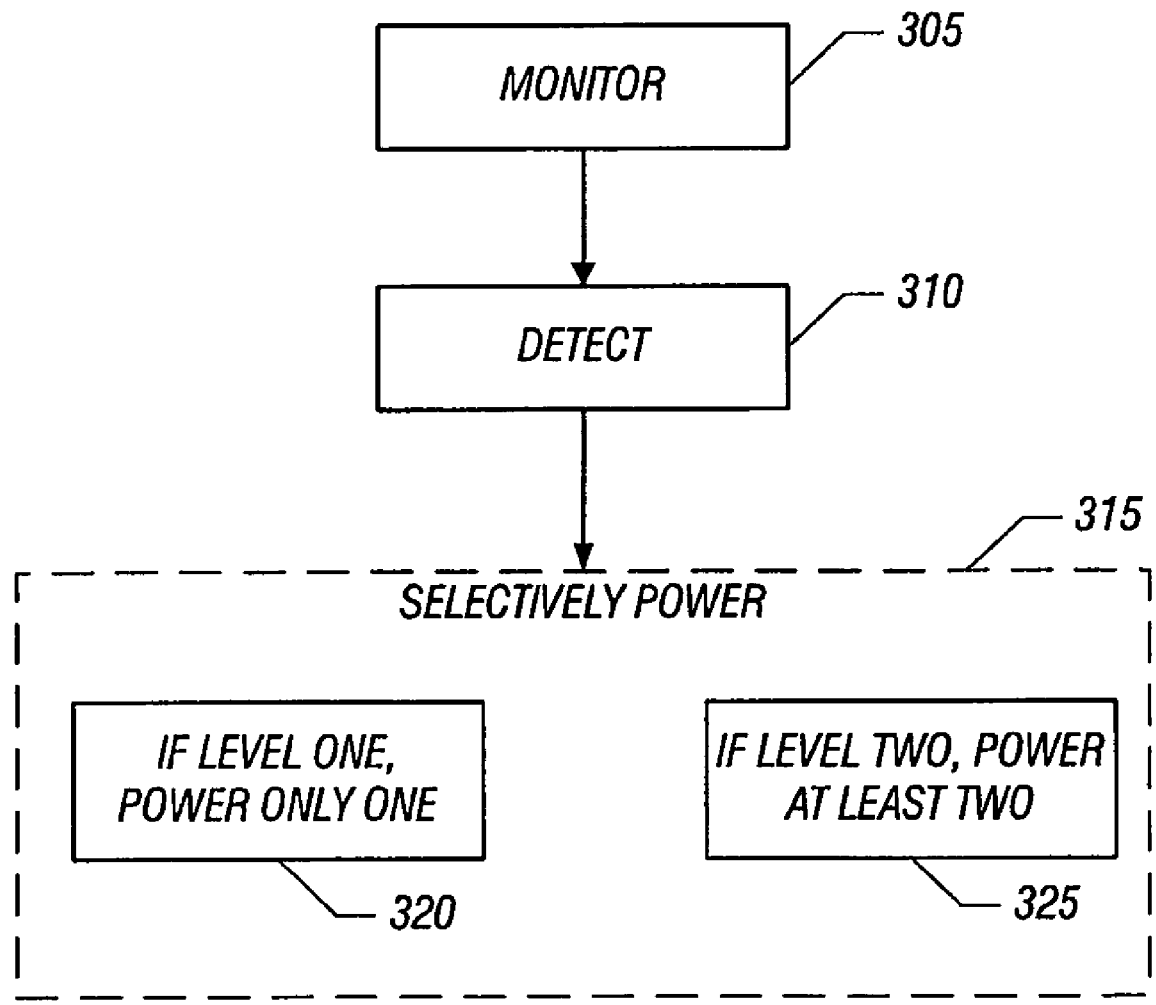
FIG. 3 illustrates a stylized representation for implementing a method of controllably illuminating automotive brake lights consistent with an exemplary embodiment of the present invention.

Referring to FIG. 3, it illustrates a stylized representation for implementing a method of illuminating the first brake light 105(1) including first and second light sources 110(1,2) consistent with an exemplary embodiment of the present invention. At block 305, the controller 115 may monitor information provided by the sensor 130 that senses a level of an operating condition associated with the brake assembly 125 or the brake pedal 120 of the motor vehicle 100. The monitoring of information may further comprise monitoring information relating to a pressure level on the brake assembly 125 and/or the brake pedal 120 of the motor vehicle 100. The monitoring information relating to a pressure level may further comprise detecting a first position of the brake assembly 125 and/or the brake pedal 120 of the motor vehicle 100 relative to an initial position of the brake assembly 125 and/or the brake pedal 120.

At block 310, the controller 115 may use the sensor 130 with the transducer 255 to detect the level of the operating condition. At block 315, the controller selectively powers the first or second light sources 110(1,2) of the first brake light 105(1) based at least in part on the monitored information to generate a variable visual indication relating to braking of the motor vehicle 100 from the first brake light 105(1) over a range of at least two different visual indications that indicate a variable braking rate of the motor vehicle 100 over a corresponding range of at least two different braking rates.

To selectively power the first or the second light source 110(1) or 110(2) of the first brake light 105(1), the controller 115 may selectively provide the power signal 160 to the first and/or the second light source 110(1) or 110(2) of the first brake light 105(1) to generate visible radiation from the first brake light 105(1). In response to the power signal 160, the controller 115 may switch the first and/or the second light source 110(1, 2) of the first brake light 105(1) on. For example, in response to the power signal 160, the controller 115 may illuminate the first brake light 105(1) for the motor vehicle 100 to provide a visible radiation having a perceivable color with a variable intensity over a range of at least two different perceivable intensities that indicate the variable braking rate of the motor vehicle 100.

For the purposes of selectively powering the first and/or the second light source 110(1, 2) of the first brake light 105(1), the controller 115 may control timing of lighting of the first and second light sources 110(1, 2) each including a light emitting diode (LED)-based light source. Alternatively, the controller 115 may controlling timing of lighting of the first and second light sources 110(1, 2) each including a light bulb.

At block 320, if the level of the operating condition is a level one, the controller 115 may power only the first or the second light source 110(1) or 110(2) of the first brake light 105(1). At block 325, if the level of the operating condition is a level two different than the level one, the controller 115 may power both the first and second light sources 110(1,2) of the first brake light 105(1). Thus, for selectively powering the first and/or the second light source 110(1, 2) of the first brake light 105(1) the controller 115 determines positions and movements of actuating devices and, in particular, of brake pedals for vehicle brake systems. The positions and movements of pistons in brake cylinders for vehicle brake systems are detected in order to determine underlying positions and movements of corresponding actuating units and, in particular, of brake pedals for controlling timing of lighting of the first and second light sources 110(1, 2) of the first brake light 105(1).

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. An automotive brake lighting system for use with a vehicle hydraulic brake system having a piston located in an associated housing of the vehicle hydraulic brake system, the automotive brake lighting system comprising:
    a brake pedal coupled to the piston of the vehicle hydraulic brake system;
    a detector integrated with the vehicle hydraulic brake system to detect a displacement of the piston of the vehicle hydraulic brake system;
    a brake light having a first and second light sources mounted, wherein the brake light is configured to indicate braking in response to the displacement of the piston of the vehicle hydraulic brake system;
    a sensor associated with the detector to provide a signal corresponding to the displacement of the piston of the vehicle hydraulic brake system for signaling selective powering of either one of the first light source or the second light source or both of the first and second light sources at substantially the same time based on calibrated braking outputs to maintain consistent braking visual indications for particular signals corresponding to sensed braking inputs;
    a controller coupled to the sensor for determining positions and movements of the brake pedal based on positions and movements of the piston for calibrating an initial position of the brake pedal to a first braking rate of the motor vehicle and a first position of the brake pedal to a second braking rate to controllably light the first and second light sources such that a unique visual warning pattern is formed by varying visual indications from the brake light in response to a change in a braking rate, wherein the calibrated brake outputs are calibrated to braking rates of the motor vehicle and wherein the automotive brake lighting system is integrated in the motor vehicle by a vehicle manufacturer.

2. The automotive brake lighting system of claim 1 further comprising:
    a memory, coupled to the controller, for storing power control information including at least timing of lighting control information, light intensity variation information, light source location information, and light source size information for selectively powering at least one of the first or second light sources of the brake light.

3. The automotive brake lighting system of claim 2, wherein the controller is configured to provide a pulse-width-modulation control for illuminating the brake light for the motor vehicle to provide a visible radiation having a perceivable color with a variable intensity over a range of at least two different perceivable intensities that indicate a variable braking rate of the motor vehicle.

4. The automotive brake lighting system of claim 1, wherein the first and second light sources each including a light emitting diode (LED)-based light source and the controller is configured to control timing of lighting of the light emitting diode (LED)-based light sources.

5. The automotive brake lighting system of claim 1, wherein the sensor is configured to monitor information relating to a pressure level on the brake pedal of the motor vehicle.

6. The automotive brake lighting system of claim 1, further comprising:
    a transducer to detect a first position of the brake pedal of the motor vehicle relative to an initial position of the brake pedal; and
    a switch matrix coupled to the transducer to illuminate one or both of the first and second light sources of the brake light, wherein the controller is configured to calibrate for the transducer the initial position of the brake pedal to a first braking rate that generates a variable visual indication relating to braking of the motor vehicle based on a first pressure level of a foot of a driver on the brake pedal so as to form a first visual warning pattern by powering the one or both of the first and second light sources of the brake light.

7. The automotive brake lighting system of claim 6, wherein the controller is configured to calibrate for the transducer first position of the brake pedal to a second braking rate that generates the variable visual indication relating to braking of the motor vehicle based on a second pressure level of the foot of the driver on the brake pedal so as to form a second visual warning pattern different than the first visual warning pattern by powering the first and second light sources of the brake light, wherein the second braking rate is higher than the first braking rate.

8. A method for providing an automotive brake lighting system for use with a vehicle hydraulic brake system having a piston located in an associated housing of the vehicle hydraulic brake system, the method comprising:
providing a brake pedal coupled to the piston of the vehicle hydraulic brake system;
using a detector integrated with the vehicle hydraulic brake system for detecting a displacement of the piston of the vehicle hydraulic brake system;
providing a brake light having a first and second light sources mounted, wherein the brake light is configured to indicate braking in response to the displacement of the piston of the vehicle hydraulic brake system;
using a sensor for generating a signal corresponding to the displacement of the piston for signaling selective powering of either one of the first light source or the second light source or both of the first and second light sources at substantially the same time based on calibrated braking inputs to maintain consistent braking visual indications for particular signals corresponding to sensed braking inputs; and
monitoring information relating to a pressure level on the brake pedal of the motor vehicle;
detecting a first position of the brake pedal of the motor vehicle relative to an initial position of the brake pedal; and
calibrating the initial position of the brake pedal to a first braking rate that generates a variable visual indication relating to breaking of the motor vehicle based on a first pressure level of a foot of a driver on the brake pedal so as to form a first visual warning pattern by powering one of the first and second light sources of the brake light.

9. The method of claim 8, further comprising:
using a controller for determining positions and movements of the brake pedal based on positions and movements of the piston for calibrating an initial position of the brake pedal to a first braking rate of the motor vehicle and a first position of the brake pedal to a second braking rate to controllably light the first and second light sources such that a unique visual warning pattern is formed by varying visual indications from the brake light in response to a change in a braking rate, wherein the calibrated brake outputs are calibrated to braking rates of the motor vehicle and wherein the automotive brake lighting system is integrated in the motor vehicle by a vehicle manufacturer.

10. The method of claim 9, further comprising:
using a memory, coupled to the controller, for storing power control information including at least timing of lighting control information, light intensity variation information, light source location information, and light source size information for selectively powering at least one of the first or second light sources of the brake light.

11. The method of claim 8, further comprising:
selectively providing a power signal to at least one of the first and second light sources of the brake light to generate visible radiation from the brake light; and
in response to the power signal, illuminating the at least one of the first and second light sources of the brake light of the motor vehicle to provide the visible radiation having a perceivable color with a variable intensity over a range of at least two different perceivable intensities that indicate a variable braking rate of the motor vehicle.

12. The method of claim 8, further comprising:
controlling timing of lighting of the first and second light sources each including a light emitting diode (LED)-based light source.

13. The method of claim 8, further comprising:
calibrating the first position of the brake pedal to a second braking rate that generates the variable visual indication relating to braking of the motor vehicle based on a second pressure level of the foot of the driver on the brake pedal so as to form a second visual warning pattern different than the first visual warning pattern by powering at least the second light source or the first and second light sources of the brake light, wherein the second braking rate is higher than the first braking rate.

14. An automotive brake lighting system, for providing a visual indication representing a pressure level associated with a brake pedal of a motor vehicle, comprising:
a first light source and a second light source, wherein the second light source is larger than the first light source and the second light source is positioned above the first light source;
at least one sensor configured to detect the pressure level associated with the brake pedal; and
a controller coupled to the at least one sensor, wherein the controller is:
(1) configured to calibrate a first position of the brake pedal to a first braking rate that generates a first visual indication relating to braking of the motor vehicle based on a first pressure level on the brake pedal and calibrate a second position of the brake pedal to a second braking rate that generates a second visual indication relating to braking of the motor vehicle based on a second pressure level on the brake pedal, wherein the controller is further configured to store power control information, in a memory, associated with calibrated movements of the brake pedal; and
(2) configured to retrieve the power control information from the memory and based at least on the power control information to power only the first light source at a first intensity when the at least one sensor detects the first pressure level, and to power the first, light source at the first intensity and the second light source at a second intensity when the at least one sensor detects the second pressure level such that as a result of the second intensity being greater than the first intensity and the second light source being larger than the first light source, the first light source and the second light source indicate a variable braking rate of the motor vehicle.

15. The automotive brake lighting system of claim 14, wherein a brake light having the first and a second light sources is mounted by a vehicle manufacturer inside a light location formed on the rear of the motor vehicle.

* * * * *